Patented Sept. 9, 1947

2,427,116

UNITED STATES PATENT OFFICE 2,427,116

HEPTAFLUOROMONOCHLOROCYCLOBUTANE AND PROCESS OF MAKING SAME

Paul L. Barrick, Wilmington, Del., assignor to E. I. du Pont de Nemours & Company, Wilmington, Del., a corporation of Delaware No Drawing. Application May 22, 1945,
Serial No. 595,255

3 Claims. (Cl. 260—648)

This invention relates to a new composition of matter and more particularly to heptafluoromonochlorocyclobutane.

This application is a continuation in part of my copending application Serial No. 484,239, filed April 23, 1943.

This invention has as an object heptafluoromonochlorocyclobutane. A further object resides in a method for preparing this compound. Additional objects will become apparent from an examination of the following description and claims.

These and other objects and advantages are accomplished according to the hereindescribed invention which comprises heating tetrafluoroethylene, that has been rendered stable against polymerization on standing under pressure at 25° C., with chlorotrifluoroethylene, that has also been rendered stable against polymerization on standing under pressure at 25° C.

The following example, in which proportions are in parts by weight unless otherwise specified, is given for illustrative purposes and is not intended to place any restrictions on the hereindescribed invention.

Example

A silver-lined high-pressure reactor was swept with nitrogen, closed, evacuated, chilled in a solid carbon dioxide/methanol mixture and charged with a mixture of 47 parts of chlorotrifluoroethylene and 34 parts of tetrafluoroethylene, which had been stabilized by reducing its oxygen content to below 40 parts per million. The reactor was then closed and heated at 150° C. for 13 hours. The reactor was then cooled to room temperature and the products recovered by venting the reactor through a solid carbon dioxide/acetone chilled trap. The condensate was fractionally distilled and 34 parts of heptafluoromonochlorocyclobutane, a liquid boiling at 23–25° C., was obtained. Analysis: Calc'd. for $C_4F_7Cl$: Cl, 16.4%; found: Cl, 15.1%

In order to provide the product of this invention, the tetrafluoroethylene and the chlorotrifluoroethylene employed in the above process should be stable against polymerization on standing under pressure at 25° C. The preparation of these stabilized polyfluoroethylenes, which is not a part of this invention, can be accomplished by various means. One method consists in reducing the normally contained oxygen content (about 0.1% to 0.2% by volume) to not more than 40 parts of oxygen in a million parts of the polyfluoroethylene. Another method for stabilizing these polyfluoroethylenes against polymerization consists in adding polymerization inhibiting compounds. Compounds of this kind are those containing thiol sulfur, examples of which are butyl mercaptan, hydrogen sulfide, and the like, and compounds containing amino nitrogen, for example, ammonia, di- and tributylamine, and other amines. These methods are described in detail in U. S. Patents to Dietrich et al., No. 2,407,405, to Brumaker, 2,407,396 and to Hanford, No. 2,407,419, each of which was filed February 15, 1943, and issued September 10, 1946. Other compounds which are sometimes used as polymerization inhibitors include hydroquinone, "Terpene B" hydrocarbon and alphapinene. The proportion of inhibitors may vary within relatively wide limits. Generally speaking, very valuable results are obtained with none or only relatively small amounts of inhibitors, corresponding to 0.0001% to 3% by weight of the material treated.

The proportion of reactants may vary somewhat but in general stoichiometric proportions are employed.

The reaction between tetrafluoroethylene and chlorotrifluoroethylene is best carried out by heating under pressure in a closed system at a temperature of 100° C. or higher and preferably not above 300° C., and in the absence of a polymerization catalyst. The reaction can, however, be effected at somewhat higher temperatures, i. e., up to 550° C. but below the decomposition temperature of the reactants and the product.

The process can be operated continuously or intermittently. The reaction and the separation or isolation of the product can be carried out simultaneously or in separate steps. The reaction can be carried out in a closed system as illustrated in the example or the reaction can be carried out in a vapor phase by mixing the vapors of the reactants, and then passing the mixture through a hot reaction tube. In general, the reaction is carried out under autogenous pressure. However, pressures within the range of from 0.1 to 1000 atmospheres can be used, the best results being obtained in the pressure range of one to 200 atmospheres.

Heptafluoromonochlorocyclobutane is useful as a refrigerant and as a power fluid since it is non-flammable and non-corrosive. This compound, like hexafluorodichlorocyclobutane, phenyltetrafluorocyclobutane, dichlorophenyltetrafluorocyclobutane and the polyfluorocyclobutanes disclosed in my copending application Serial No.

484,239, filed April 23, 1943, is useful as an electrical insulating liquid, e. g. dielectric.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

1. Heptafluoromonochlorocyclobutane.

2. The process for obtaining heptafluoromonochlorocyclobutane, which comprises heating tetrafluoroethylene with chlorotrifluoroethylene, said tetrafluoroethylene and said chlorotrifluoroethylene having been rendered stable against polymerization on standing under pressure at 25° C., said heating being effected under pressure within the range of 0.1 to 1,000 atmospheres at a temperature within the range of from 100° C. to 300° C.

3. The process for obtaining heptafluoromonochlorocyclobutane, which comprises heating chlorotrifluoroethylene with tetrafluoroethylene, each of which has been rendered stable against polymerization on standing under pressure at 25° C., said heating being effected in a closed system under autogenous pressure at a temperature from 100° C. to 550° C.

PAUL L. BARRICK.

REFERENCES CITED

The following references are of record in the file of this patent:

FOREIGN PATENTS

| Number | Country | Date |
|---|---|---|
| 796,026 | France | Mar. 27, 1936 |

OTHER REFERENCES

Swarts, Chemical Abstracts, vol. 30, cols. 4153–4154 (1936).

Ellis, Chemistry of Petroleum Derivatives, vol. I, pp. 746–747.

Egloff, Reactions of Pure Hydrocarbons, pp. 586–589.